Patented May 19, 1942

2,283,589

UNITED STATES PATENT OFFICE 2,283,589

AGENT FOR ACCENTUATING PERFUMES AND FOOD FLAVORS AND PROCESS FOR PRODUCING THE SAME

Charles H. Stuart, Newark, N. Y.

No Drawing. Application November 17, 1939, Serial No. 305,043

7 Claims. (Cl. 99—140)

It is well known that many perfumes and flavors are extremely delicate and fleeting. For example, certain perfumes are quite useless unless blended with another substance having the power of accentuating the perfume and increasing its persistence. Examples of such substances are musk, civet, ambergris, and ambrette. Again, some odors that are extremely unpleasant in high concentration are distinctly agreeable when very dilute. Such an odor is that of civet, which in very dilute form is much used in perfumes. Similarly, certain food flavors are of no practical value unless blended with a substance of complementary flavor, often by itself distinctly disagreeable. Thus, a bitter base often accentuates the flavor. Nature often provides such a bitter base, as for example, in peaches, plums and citrous fruits. Vanilla is one example of a flavor that is both delicate and fleeting. When foods are flavored with vanilla, only the first few mouthfuls will possess the characteristic vanilla flavor, unless a suitable complementary flavor of greater permanence be added. In this particular case the substance commonly added is coumarin. Coumarin is not a substitute for vanilla, but acts in some way to fix and accentuate it so that food containing both vanilla and coumarin seems to the taste to have a much more pronounced and persistent vanilla flavor than food containing vanilla alone.

Perfumes and flavors are probably closely related. In fact, the physiological effect of flavor may be partly due to odor, which affects the olfactory sense at the moment of masticating or swallowing. The evanescent nature of some perfumes and flavors may be actual, and due to high volatility, but more often it is probably physiological, and the result of fatigue of the senses, which require to be continually resensitized in order that the effect may last. Thus the last spoonful of icecream flavored with vanilla will contain just as much vanilla as the first spoonful, yet it will be relatively lacking in vanilla taste unless coumarin is added; but this is not the only effect of adding coumarin, since the first spoonful will also have a more pronounced vanilla flavor. There are therefore two distinct effects that are desirable and sought after, namely enhancement of the perfume or flavor and increase in its persistence or permanence. Since the exact explanation of these phenomena is not known, I do not wish to be held to any particular theory. In this specification I will therefore use the term "accentuating agent" to denote any agent which when added to some particular aromatic essence, perfume or flavor will enhance its initial effect, either by a blending or other modifying action, or by providing a contrasting background or base, or by stimulating or sensitizing the olfactory or gustatory senses; or which will increase the persistence of the perfume or flavor, as by reducing its volatility or stabilizing or fixing its effect in some other way, or restimulating or resensitizing the senses referred to.

I have now discovered that, entirely apart from the residual cocoanut oil, copra contains constituents which can be used as an accentuating agent for certain perfumes and extracts. The oil is of course not water soluble, whereas the constituents to which I refer are not only of unlimited solubility in water, but have none of the characteristic odor or flavor of cocoanut oil. In fact, they must be substantially free from cocoanut oil in order best to serve my purpose. Hence I prefer to extract these constituents from copra meal from which the oil has been previously expressed under high pressure. In the course of this expressing operation the copra meal becomes heated through the work of friction and this heating increases the fluidity of the oil and the completeness with which it is removed. It may also to some extent modify the meal, as by partially cooking it. At any rate, I have found that such meal contains water soluble constituents hereto unsuspected, which are very valuable for the purpose I have indicated.

For the purpose of my invention I may extract these constituents by means of water, but I find that in that case the batch is liable to ferment, spoiling both the extract and the marc, which otherwise has value as animal food.

Since the product is water soluble, only water compatible solvents are entirely suitable. Also, since the product is to be used in perfumes and food flavors, it is necessary to avoid solvents having a pronounced or disagreeable odor of their own, such as methyl alcohol or some of the higher alcohols. Again, since the copra meal still contains seven to ten percent of cocoanut oil it is necessary to avoid solvents, such as ether, which would remove the unwanted oily constituent. In other words, the ideal solvent is one which shall be agreeably aromatic, potable and water compatible, and hence possess selective affinity for the water soluble constituents, as distinguished from the oily constituents. At present the solvent that I prefer to use is ethyl alcohol, which happens also to be the menstruum in which most perfumes and flavors are used.

While the concentration of the alcohol to be used for my purpose is not critical I find that moderate concentrations are to be preferred. Thus, if the alcohol is below a concentration of substantially 40% it tends to produce a cloudy solution containing proteins, which however, settle out upon standing.

On the other hand, if the concentration is above 60% the alcohol tends to extract a trace of cocoanut oil, also undesirable proteins, which begin to be slightly soluble in the concentrated extract. The oil will collect upon the surface of the solution and can be removed; nevertheless this operation is not a simple one and I prefer to avoid it by using a concentration between these two limits. When this is done I obtain a clear extract which can of course be concentrated by evaporation to any desirable extent. As evaporation proceeds the product becomes first a syrup and then a solid, having about the color and consistency of molasses candy. Any further evaporation is liable to result in decomposition. While the composition of my product has not yet been determined, it evidently contains sugars, esters, and volatile constituents.

My extract can be produced from copra meal by any approved extraction method. For instance, the solvent can be passed through the meal upwards or downwards; but for practical reasons I prefer to pass the solvent downward through the meal, remove only a portion of the solution for use at each operation and recycle the remainder. I prefer to finish the operation in such a way that the nearly exhausted meal is contacted with fresh solvent. In this way I can produce an extract containing 12½ to 25 percent of solids. The exhausted meal is finally treated with steam to distill off the last traces of alcohol and may then be used as cattle fodder, for which purpose its value is found to be unimpaired.

I prefer to market my product in liquid form, consisting of about 25% of solids dissolved in 40 to 60% alcohol. This liquid has a pleasant aromatic odor but no suggestion of cocoanut or other recognizable odor or flavor. When the product is concentrated to a solid without decomposition, it retains this pleasant but difficultly definable odor.

When a small quantity of copra extract made in accordance with my process is added to natural vanilla or synthetic vanillin, the characteristic vanilla odor and flavor are noticeably enhanced. This is particularly true when coumarin is also present. In fact, the flavor of vanilla containing coumarin, which is too strong to be agreeable to some people, is in some way corrected by addition of my copra extract and rendered delightfully palatable. When such vanilla is used to flavor icecream or pastry the flavor of vanilla is not only notably enhanced, but it continues to the last mouthful.

Repeated tests by groups of connoisseurs as well as by reputable testing laboratories have shown that foods flavored with vanilla type flavors, containing my copra extract, with or without coumarin, are preferred to the same food flavored with the same quantity of the same material, to which my extract has not been added, and samples of the former foods are readily distinguished from samples of the latter foods by the expert and inexpert alike.

I do not wish to be limited to ethyl alcohol as the extraction medium, as it is possible to use for this purpose water in combination with a preservative that will prevent fermentation.

Although at present the only practical use I have found for my new product is as an accentuating, blending or perpetuating agent or fixative for perfumes, odors and food flavors, as my product is a new article of commerce other uses are very likely to be found for it.

I claim as my invention:

1. The process for production of an accentuating agent for essences agreeable to the senses of taste and smell, and their synthetic analogues, which comprises extracting copra, from which the oil has been largely expressed, but which otherwise contains subtantially all its original natural constituents, with aqueous ethyl alcohol of a concentration of not over substantially 60 per cent.

2. As a new article of commerce, the product resulting from the extraction of copra, from which the oil has been largely expressed, but which otherwise contains substantially all its original natural constituents, by means of aqueous ethyl alcohol of a concentration of substantially 40 to 60 per cent.

3. As a new article of commerce, the product resulting from the extraction of copra, from which the oil has been largely expressed, but which otherwise contains substantially all its original natural constituents, by means of aqueous ethyl alcohol of a concentration of not over substantially 60 per cent, blended with a material of the class consisting of the essences, and their synthetic analogues, agreeable to the senses of taste and smell.

4. The process for accentuating essences, and their synthetic analogues, agreeable to the senses of taste and smell, which comprises adding thereto a minor proportion of the product resulting from the extraction of copra, from which the oil has been largely expressed but which otherwise contains substantially all its original natural constituents, by means of aqueous ethyl alcohol of a concentration of not over substantially 60 per cent.

5. The process for production of an accentuating agent for food flavors of the group consisting of vanilla and vanillin, alone and in combination with coumarin, which comprises extracting copra, from which the oil has been largely expressed, but which otherwise contains substantially all its original natural constituents, with aqueous ethyl alcohol of a concentration of not over substantially 60 per cent.

6. As a new article of commerce the product of the extraction of copra from which the oil has been largely expressed, but which otherwise contains substantially all its original natural constituents, by means of aqueous ethyl alcohol of a concentration of not over substantially 60 per cent, blended with a food flavor of the group consisting of vanilla, vanillin and coumarin, alone and in combination.

7. The process for accentuating food flavors of the group consisting of vanilla, vanillin and coumarin, alone and in combination, which comprises adding thereto a minor proportion of the product of the extraction of copra, from which the oil has been largely expressed, but which otherwise contains substantially all its original natural constituents, by means of aqueous ethyl alcohol of a concentration of not over substantially 60 per cent.

CHARLES H. STUART.